(No Model.)
W. A. SHEPARD.
REFRIGERATING APPARATUS.
No. 547,385. Patented Oct. 1, 1895.
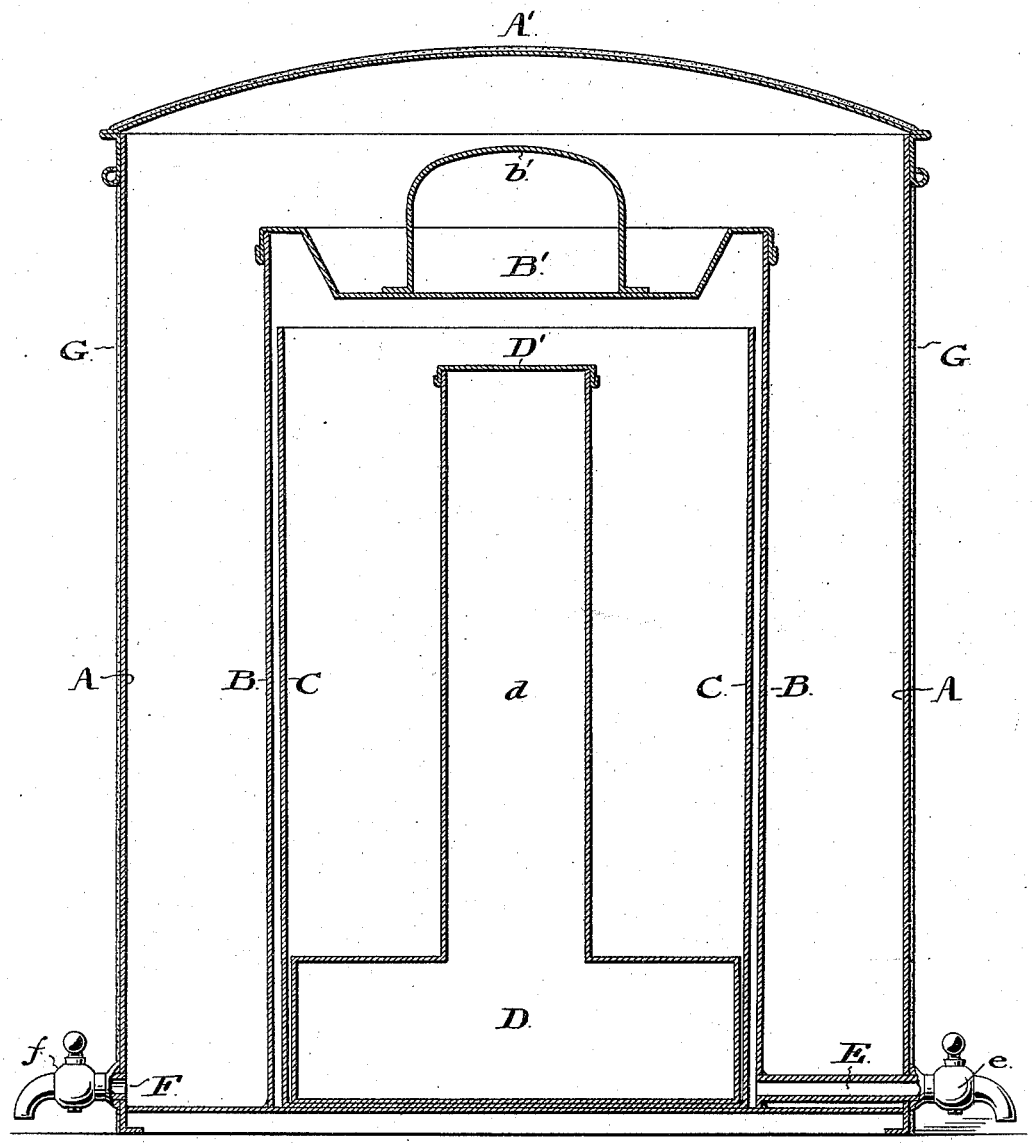
WITNESSES:
Ben. S. Webster
W. T. Norton
INVENTOR:
William A. Shepard
By M. W. Dudley & Co.
his Attys.

UNITED STATES PATENT OFFICE.

WILLIAM ALBERT SHEPARD, OF PHILADELPHIA, PENNSYLVANIA, ASSIGNOR TO THE PORTABLE REFRIGERATOR AND FREEZER COMPANY, OF WEST VIRGINIA.

REFRIGERATING APPARATUS.

SPECIFICATION forming part of Letters Patent No. 547,385, dated October 1, 1895.

Application filed May 24, 1895. Serial No. 550,532. (No model.)

*To all whom it may concern:*

Be it known that I, WILLIAM ALBERT SHEPARD, a citizen of the United States, residing at Philadelphia, in the county of Philadelphia and State of Pennsylvania, have invented certain new and useful Improvements in Refrigerating Apparatus, of which the following is a specification.

The nature of my invention consists in constructing an apparatus which will constitute a cooler, refrigerator, or freezer, by having certain movable parts which will be adjustable to the objects to be attained.

The object of my invention is to make an apparatus of small cost which can be used as a water-cooler in which the water will not come in contact with the ice, a freezer of cream and other articles, or a refrigerator which will keep for several days in a fresh and sound condition opened oysters or clams, or fresh fish or lobsters, or perishable fruit or ice-cream, or butter or fresh meats of all kinds, so that those articles may be transported in good condition to points far distant from the markets where they are purchased.

In the accompanying drawing I have shown in a vertical central sectional view my improved apparatus, and I will now describe the same in detail, reference being made by letters marked on said drawing.

In carrying out my invention I construct a strong vessel A, of any suitable sheet metal, of a cylindrical or rectangular form, as may be desired, and of such size as may be required, which will be the outer shell of my apparatus. Within this outer vessel I place a smaller vessel B of the same shape, the bottom of which is firmly fastened to the bottom of the outer one. This inner vessel may be made of lighter material than the other, if desired, and is slightly flared from the bottom to the top to permit a third vessel C of the same shape, but slightly smaller, to be placed in and taken out of it quickly, so that it may be conveniently filled or emptied of the substance required to be kept or transported in it. The space between the outer shell A and the smaller fixed vessel B within it must be sufficiently large to permit pieces of broken ice about three inches thick to be placed in it, so that the ice will not melt quickly. When the inner or movable vessel C is filled and placed in the inner fixed vessel B, a tightly-fitting cover B' is shut down over the fixed vessel, so that nothing can slop out of or into the movable vessel, which will hold the substance to be preserved. Said cover B' is in the form of a pan, and can be filled with cracked ice, when desired. A handle b' is connected to said cover. When cream or any other substance is to be frozen, I place a shallow pan D, about three-fourths to an inch in thickness, with fixed top and bottom, down on the bottom of the movable vessel, it being of nearly the same size as the bottom. This pan has a cylinder d let into and rising up from the center of its top to nearly the top of the movable vessel through which the pan is filled with cracked ice when freezing is required, the cylinder also being filled with ice and tightly closed with a cap or cover D' at top, and when freezing is required salt must be mingled with the ice in the usual way in all the ice-spaces of the apparatus. I place two pipes at the bottom of the apparatus— one E leading from the inner fixed vessel to a faucet e on the outside and the other F leading from the outer ice-space and provided with a faucet f to draw off the water from the melting ice. The pipe leading from the inner fixed vessel is only used when the apparatus is used as a water-cooler. At such times all the movable parts of the apparatus are removed. When the apparatus is used as a portable refrigerator, the freezing-pan and cylinder and salt mixture may be dispensed with, except when ice-cream is to be kept in it.

When the apparatus is completed as above described, I cover the outside with strong paper felt G, put on with a very adhesive paste, and I varnish the outside of this felt with a waterproof varnish. This felt keeps the outer shell from being affected by the warm air outside, as it is a non-conductor. The outer shell A is provided with a cover A', also covered with felt.

I claim as my invention—

1. The combination in an apparatus of the class described of an outer cylinder A having an outlet, an inner vessel B fixedly secured and having a pipe leading without the outer cylinder and provided with a closure, a second vessel C within the vessel B but removable therefrom, and a removable cylinder D within the vessel C, all substantially as and for the purpose set forth.

2. In an apparatus of the class described, the combination with an outer cylinder having a non conducting covering, and a controllable outlet, an inner vessel fixed to the base of said cylinder and provided with a pipe extending without the cylinder, a pan-shaped cover for said vessel, a second vessel arranged within and removable from the said vessel, and a second cylinder removably arranged within the second vessel and having a vertical extension and a closure for the latter.

WILLIAM ALBERT SHEPARD.

Witnesses:
W. T. NORTON,
F. L. BROWNE.